United States Patent [19]

Ramanathan et al.

[11] Patent Number: 4,654,384
[45] Date of Patent: Mar. 31, 1987

[54] BASIC WATER-SOLUBLE BIS-(β-AZO-α-NAPHTHOLAMINO)-TRIAZINE COMPOUNDS

[75] Inventors: Visvanathan Ramanathan, Basel; Peter Möckli, Schönenbuch, both of Switzerland

[73] Assignee: Ciba-Geigy Corporation, Ardsley, N.Y.

[21] Appl. No.: 570,254

[22] Filed: Jan. 12, 1984

[30] Foreign Application Priority Data

Jan. 14, 1983 [CH] Switzerland ............... 207/83

[51] Int. Cl.⁴ ............... C09B 33/12; C09B 35/34; C09B 44/08; D06P 1/41

[52] U.S. Cl. ............... 534/604; 534/605; 534/589; 534/797; 544/197; 544/198

[58] Field of Search ............... 534/605, 604, 608, 797; 260/153

[56] References Cited

U.S. PATENT DOCUMENTS 4,273,707  6/1981  Pedrazzi ............... 260/187

FOREIGN PATENT DOCUMENTS 0011957  2/1981  Japan ............... 534/797

Primary Examiner—Floyd D. Higel
Attorney, Agent, or Firm—Wenderoth, Lind & Ponack

[57] ABSTRACT

Novel water-soluble triazine compounds of the formula

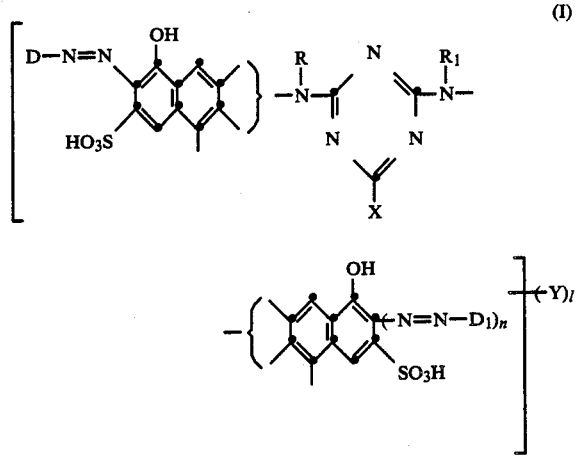

in which D and $D_1$ independently of one another are radicals of diazo components, R and $R_1$ independently of one another are hydrogen or $C_1$–$C_4$-alkyl, X is a monosubstituted or disubstituted amino group, a $C_1$–$C_4$-alkoxy group or an aryloxy group, the symbols Y are basic or cationic groups, which can be identical or different, l is 2, 3, 4, 5 or 6 and n is 0 or 1, and the number of basic and/or cationic groups Y in the molecule must be equal to or greater than the number of $SO_3H$ groups are useful as dyes for dyeing and printing textile materials, leather and in particular, paper. The dyeings have good general fastness properties and the effluents remain colorless.

3 Claims, No Drawings

BASIC WATER-SOLUBLE BIS-(β-AZO-α-NAPHTHOLAMINO)-TRIAZINE COMPOUNDS

The invention relates to novel water-soluble triazine compounds, processes for their preparation and their use as dyes for dyeing and printing textile materials, leather and, in particular, paper.

The novel water-soluble triazine compounds are those of the formula I

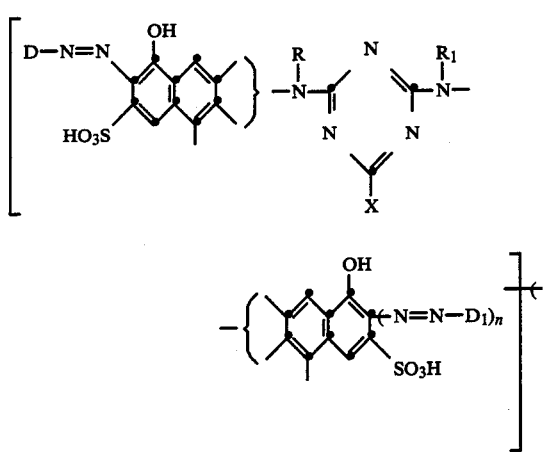

in which D and $D_1$ independently of one another are radicals of diazo components, R and $R_1$ independently of one another are hydrogen or $C_1$-$C_4$-alkyl, X is a monosubstituted or disubstituted amino group, a $C_1$-$C_4$-alkoxy group or an aryloxy group, the symbols Y are basic or cationic groups, which can be identical or different, l is 2, 3, 4, 5 or 6 and n is 0 or 1, and the number of basic and/or cationic groups Y in the molecule must be equal to or greater than the number of $SO_3H$ groups.

D and $D_1$ can be identical or different and, as diazo components, are radicals of the formula

$$D_2-(N=N-D_3)_m-,$$

in which $D_2$ is a radical of the benzene, naphthalene or heterocyclic series (for example benzothiazole, isobenzothiazole or dibenzofuran), $D_3$ is phenylene or naphthylene and m is 0 or 1, and in which $D_2$ and/or $D_3$ can be substituted; examples of substituents are: halogen (for example fluorine, chlorine or bromine), $C_1$-$C_4$-alkyl (for example methyl, ethyl, n-propyl, iso-propyl, n-butyl, sec.-butyl or tert.-butyl), $C_1$-$C_4$-alkoxy (for example methoxy, ethoxy, n-propoxy, iso-propoxy, n-butoxy, sec.-butoxy or tert.-butoxy), acetylamino, benzoylamino, phenoxy, $SO_3H$, CN, CO-($C_1$-$C_4$)-alkyl (for example methylcarbonyl, n-propylcarbonyl, iso-propylcarbonyl, n-butylcarbonyl or isobutylcarbonyl) and heterocyclic rings (for example benzothiazole).

In the preferred triazine compounds, n is 1 and D and $D_1$ are identical and are benzene or azobenzene radicals which are unsubstituted or substituted by $C_1$-$C_4$-alkyl, in particular methyl, $C_1$-$C_4$-alkoxy, in particular methoxy or ethoxy, acetylamino or a 6-methyl-benzothiazole radical.

A $C_1$-$C_4$-alkyl group R or $R_1$ is, for example, methyl, ethyl, n-propyl, iso-propyl, n-butyl or sec.-butyl. In the preferred triazine compounds of the formula I, R and $R_1$ are each hydrogen.

A monosubstituted or disubstituted amino group X is, for example, a mono- or di-$C_1$-$C_4$-alkylamino group, in which the alkyl radical can also be substituted, for example by OH; a phenylamino group, in which the phenyl radical can be substituted by an unsubstituted $C_1$-$C_4$-alkyl group or by a substituted (for example OH-substituted) $C_1$-$C_4$-alkyl group; or a group of the formula

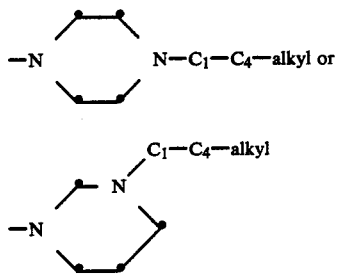

An aryloxy group X is, in particular, the phenoxy group, in which the phenyl radical can be substituted, for example by an unsubstituted $C_1$-$C_4$-alkyl group or by a substituted (for example OH-substituted) $C_1$-$C_4$-alkyl group.

All the $C_1$-$C_4$-alkyl groups mentioned in connection with X can be straight-chain or branched; they are, for example, the methyl, ethyl, n- and iso-propyl and n-, sec.- and tert.-butyl groups.

A $C_1$-$C_4$-alkoxy group X can be straight-chain or branched; this is, for example, the methoxy, ethoxy, n- or iso-propoxy or n-, sec.- or tert.-butoxy group.

A basic group Y is, in particular, the group of the formula

in which $T_1$ and $T_2$ independently of one another are hydrogen, unsubstituted $C_1$-$C_4$-alkyl or substituted $C_1$-$C_4$-alkyl, examples of substituents being: OH, $C_1$-$C_4$-alkoxy and the

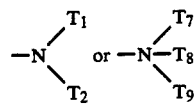

groups, in which $T_7$, $T_8$ and $T_9$ are as defined below.

However, $T_1$ can also be linked with $T_2$ to form a heterocyclic ring including the nitrogen atom, for example to form a pyrrolidine, piperidine, morpholine or piperazine ring.

A cationic group Y is, for example, one of the following groups:

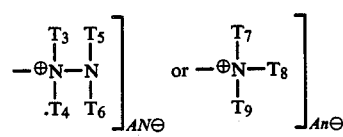

in which $T_3$ and $T_4$ independently of one another are $C_1$–$C_4$-alkyl or cycloalkyl, in particular cyclopentyl or cyclohexyl, which is unsubstituted or substituted by $C_1$–$C_4$-alkyl; $T_5$ and $T_6$ independently of one another are hydrogen, $C_1$–$C_4$-alkyl or cycloalkyl, in particular cyclopentyl or cyclohexyl, which is unsubstituted or substituted by $C_1$–$C_4$-alkyl; $T_7$ is $C_1$–$C_4$-alkyl which is unsubstituted or substituted by phenyl, $C_1$–$C_4$-alkylphenyl, OH, halogen, CN or the group

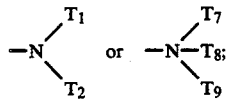

or is cycloalkyl, in particular cyclopentyl or cyclohexyl, which is unsubstituted or substituted by $C_1$–$C_4$-alkyl; $T_8$ is $C_1$–$C_4$-alkyl which is unsubstituted or substituted by phenyl, $C_1$–$C_4$-alkylphenyl, OH, halogen, CN or the group

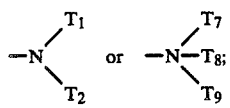

or $T_8$ is cycloalkyl, in particular cyclopentyl or cyclohexyl, which is unsubstituted or substituted by $C_1$–$C_4$-alkyl, or is a straight-chain or branched $C_1$–$C_4$-alkoxy group; and $T_9$ is $C_1$–$C_4$-alkyl which is unsubstituted or substituted by phenyl, $C_1$–$C_4$-alkylphenyl, OH, halogen, CN or the group

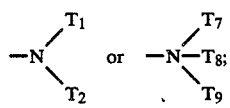

or $T_7$, together with $T_8$ and $T_9$ and including the N atom, is a heterocyclic ring, in particular a substituted or unsubstituted pyridinium ring or a triethylenediamine ring of the formula

The $C_1$–$C_4$-alkyl groups in connection with Y can be straight-chain or branched. These are, for example, the methyl, ethyl, n- and iso-propyl and n-, sec.- and tert.-butyl groups.

Examples of basic groups Y are:

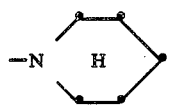

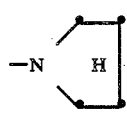

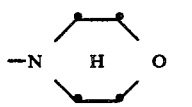

—N(CH$_3$)$_2$

—N(C$_2$H$_5$)$_2$

—NH—CH$_3$

—NH$_2$

—NH—C$_3$H$_7$

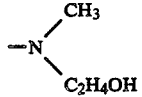

—N(C$_2$H$_4$OH)$_2$

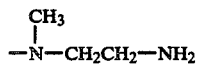

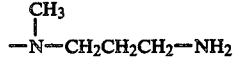

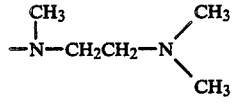

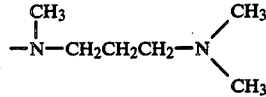

and
Examples of cationic groups Y are:

—⊕N(CH$_3$)$_3$

—⊕N(C$_2$H$_5$)$_3$

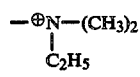

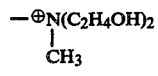

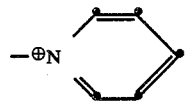

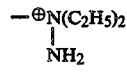

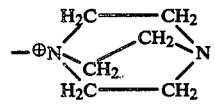

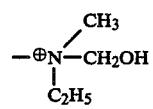

-continued

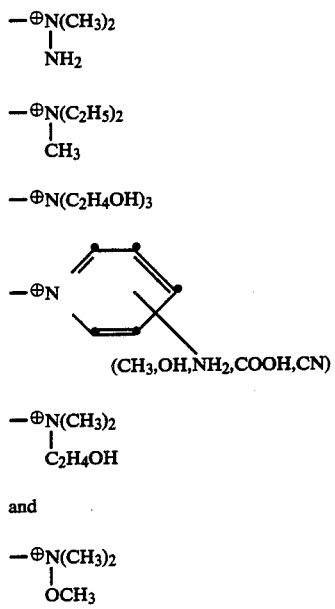

In particularly useful triazine compounds of the formula I, a basic group Y is the —NH₂, —N(CH₃)₂ or —N(C₂H₅)₂ group, and a cationic group Y is —⊕N(CH₃)₃ or the pyridinium group.

The basic and/or cationic groups Y can be located in D, D₁ or D₂ and D₃ and, in particular, in X; the basic amino groups and cationic ammonium groups can be bonded, for example, to an alkyl radical, a heterocyclic radical or an aryl radical, whilst the cationic pyridine and hydrazine radicals are preferably bonded to an alkyl radical.

In the preferred triazine compounds of the formula I, one radical Y is located in X. The resulting —X—Y combination is, in particular, an aliphatic, aromatic, araliphatic or heterocyclic diamine; for example one of the following —X—Y combinations:

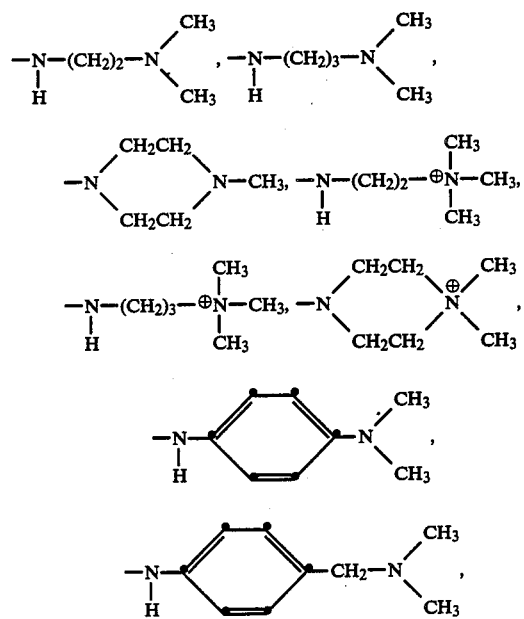

-continued

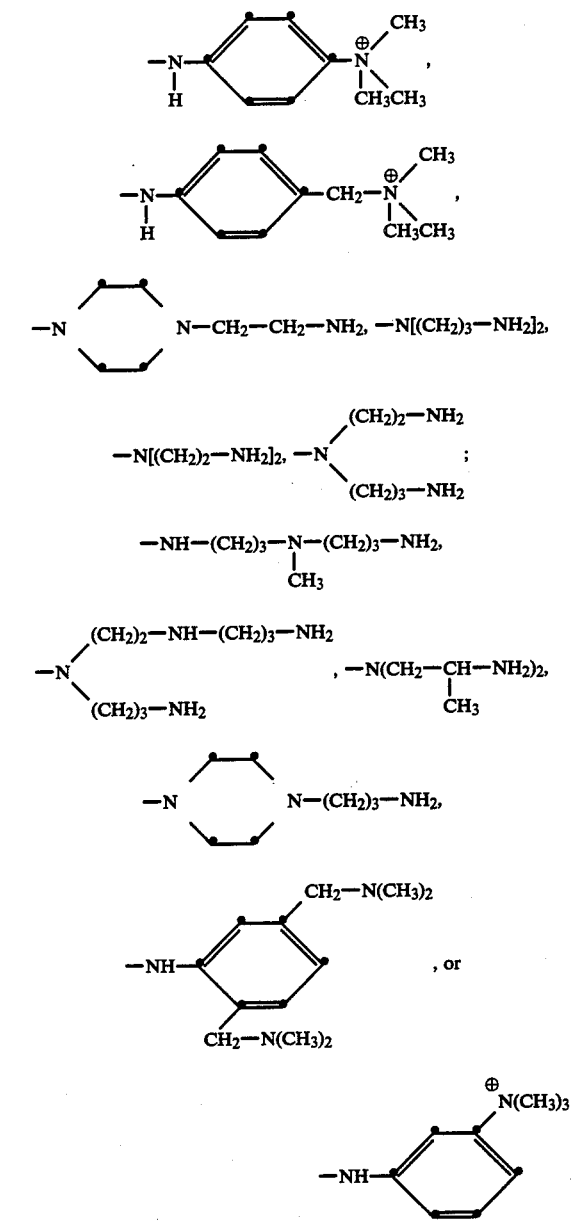

Suitable anions An are both inorganic and organic anions; examples are: halogen, such as chloride, bromide or iodide ions, and sulfate, methylsulfate, aminosulfonate, perchlorate, carbonate, bicarbonate, phosphate, phosphoromolybdate, phosphorotungstate, phosphorotungstomolybdate, benzenesulfonate, naphthalenesulfonate, 4-chlorobenzenesulfonate, oxalate, maleate, formate, acetate, propionate, lactate, succinate, chloroacetate, tartrate, methanesulfonate and benzoate ions, or complex anions, such as those of zinc chloride double salts.

The anion is generally determined by the preparation process. It is preferably the chloride, bisulfate, sulfate, methosulfate, phosphate, formate or acetate anion. The anions can be replaced by other anions in a known manner.

The novel triazine compounds of the formula I are prepared in a known manner, for example by diazotising an amine of the formula II NH$_2$—D (II) and, if appropriate, IIa NH$_2$D$_1$ (IIa)

and coupling the diazotisation product to a compound of the formula III

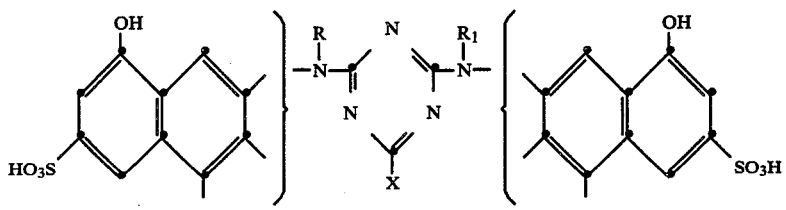

in which the basic and/or cationic group Y is located in the radical D, D$_1$ and/or X and the symbols D, D$_1$, R, X, R$_1$ and Y are otherwise as defined.

The amines of the formulae II and IIa are known and can be prepared by known methods.

The diazotisation and coupling are also carried out in a known manner; thus, for example, the coupling is preferably carried out in acid, neutral or weakly alkaline solution; the coupling temperature is, in particular, between 0° and 50° C.

Compounds of the formula III are obtained, for example, by reacting 2 moles of I-acid, G-acid and/or M-acid with 1 mole of a cyanuric halide, in particular cyanuric chloride, and reacting the resulting monochlorotriazine compound with a compound which introduces X or X—Y. The individual steps can of course also be interchanged and, for example, the compound which introduces X or X—Y can first be condensed with the cyanuric halide.

Examples of the large number of compounds which introduce X or X—Y are: N-(2-aminoethyl)-piperazine, dipropylenetriamine, diethylenetriamine, (aminoethyl)-(aminopropyl)-amine, N-(3-aminopropyl)-piperazine, diisopropylenetriamine, 2,5-bis-(dimethylaminomethyl)-aniline, 3-aminophenyl-trimethyl-ammonium chloride, dimethylaminopropylamine, dimethylaminoethylamine, N,N-dimethyl-4-aminobenzylamine, dimethylamine, ethanolamine, diethanolamine, propanolamine and dipropanolamine.

The triazine compounds of the formula I are used either as powder or granular preparations or in the form of concentrated solutions. Powder preparations are made up in the conventional manner using formulating materials such as sodium sulfate, phosphate, chloride or acetate in the presence of dust removal agents, or the triazine compounds are marketed directly as spray-drying preparations. Concentrated dye solutions can be aqueous or aqueous/organic in nature, conventional additives which do not pollute the environment and can be degraded as completely as possible being preferred, such as organic acids, preferably acetic acid, formic acid, lactic acid or citric acid, amides, such as formamide or dimethylformamide, urea, alcohols, such as glycol, diglycol or diglycol ether, and, preferably, methyl ether or ethyl ether.

The water-soluble triazine compounds of the formula I are used, in particular, as dyes for dyeing and printing natural and synthetic substrates which can be dyed with cationic dyes, in particular paper, unfinished cardboard and cardboard, in pulp form or on the surface, and textile materials which, for example, advantageously consist of homopolymers or copolymers of acrylonitrile, or synthetic polyamides or polyesters modified by acid groups. These textile materials are preferably dyed in an aqueous, neutral or acid medium by the exhaustion method, if necessary under pressure, or by the continuous method. The textile material can be in very different forms, for example as fibres, filaments, woven fabrics, knitted fabrics, piece goods and finished goods, such as shirts or pullovers.

Level dyeings and prints which have very good general fastness properties, and especially a very high degree of exhaustion and good fastness properties in water, can be produced with the dyes according to the invention.

Moreover, the novel triazine compounds of the formula I can also be used for dyeing and printing natural and regenerated cellulose materials, especially cotton and viscose, deep dyeings likewise being obtained.

On these textile materials, the novel triazine compounds of the formula I have a good absorption capacity and a high degree of exhaustion and the resulting dyeings have very good fastness properties, especially wet-fastness.

Moreover, the novel disazo compounds can be used for spin-dyeing polyacrylonitrile materials and for dyeing polyacrylonitrile wet tow. They can also be used for stamp dyes and in jet printing.

A preferred use of the novel triazine compounds of the formula I is that for dyeing all types of paper, especially bleached, unsized and sized lignin-free paper, in which case the starting material can be bleached or unbleached pulp, and hardwood or softwood pulp, such as birch and/or pine sulfide and/or sulfate pulp, can be used. These compounds are especially suitable for dyeing unsized paper (for example serviettes, tablecloths and paper for hygiene purposes), as a result of their very high affinity for this substrate.

The absorption of the novel triazine compounds of the formula I onto these substrates is very good, and the effluents remain colourless, which is a great ecological advantage, especially in view of the present-day effluent laws.

The dyeings obtained have very good general fastness properties, such as good light-fastness together with a high clarity and depth of colour, and wet-fastness, i.e. they show no tendency to bleed when wet coloured paper is brought into contact with moist white paper. They also have a good fastness to alum, acid and alkali. The wet-fastness relates not only to water but also to milk, fruit juices and sweetened mineral water; because of their good alcohol-fastness, they are also resistant to alcoholic drinks. This property is particularly desirable, for example, with serviettes and tablecloths, with which it can be foreseen that the wet coloured paper (for example soaked with water, alcohol, surfactant solution and the like) comes into contact with other surfaces, such as textiles, paper and the like, which must be protected from staining.

The high affinity for paper and the high rate of exhaustion of the novel dyes is of great advantage for the continuous dyeing of paper.

Finally, the novel triazine compounds of the formula I can also be used for dyeing leather (for example by spraying, brushing and dipping) and for the preparation of inks.

The following examples illustrate the invention, without limiting it thereto. Unless otherwise indicated, the parts (p) are by weight and the temperatures are given in degrees centigrade.

PREPARATION OF THE STARTING SUBSTANCES

Example 1:

48 parts of I-acid are suspended in 700 parts of water and the suspension is brought to pH 7 with 30% aqueous sodium hydroxide solution, a clear solution being formed. This solution is cooled to 5° and a solution of 18.5 parts of cyanuric chloride in 100 parts by volume of acetone is added dropwise. The acid liberated by the condensation is slowly neutralised with 2N sodium hydroxide solution and a pH of about 6 is maintained. The means of cooling is removed and the temperature of the condensation mixture is allowed to rise to room temperature. The mixture is then warmed to 40°–45°, in order to bring the reaction to completion, and is stirred until no further I-acid can be detected. (Test by diazotisation and coupling to R-salt solution). 15 parts of N-(2-aminoethyl)-piperazine are added to this solution of the monochloro compound and the reaction mixture is heated to 80° and stirred at this temperature for 6 hours. When the condensation has ended, the coupling component of the formula

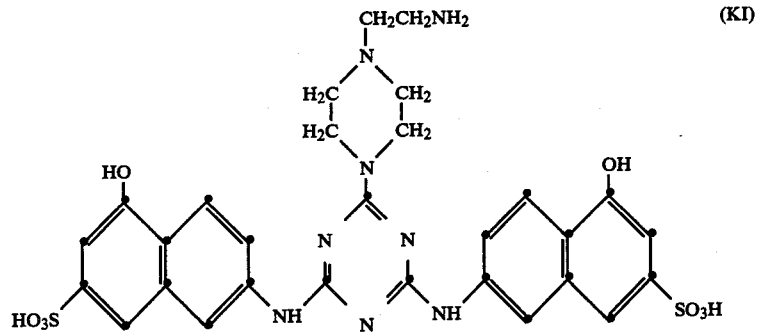

is obtained as the amine salt.

The procedure described above is repeated, using the same amount of di-(3-aminopropyl)-amine instead of N-(2-aminoethyl)-piperazine. The compound of the formula

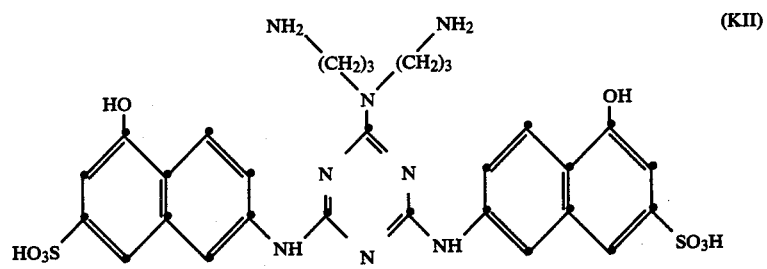

is obtained.

Example 2:

71.7 parts of 2-amino-5-naphthol-7-sulfonic acid are suspended in 1,050 parts of water and the pH is brought to 7.0 with sodium hydroxide solution. 28.5 parts of cyanuric chloride dissolved in 120 parts of acetone are added dropwise at 10° in the course of 25 minutes and the mixture is subsequently stirred at 0°–10° for 2 hours. The pH is then brought to 6.7 with 2N sodium hydroxide solution and stirring is continued at room temperature for another 4 hours and at 40°–45° for 1 hour, the pH being kept at 6.7.

After clarification by filtration, 45.9 parts of 3-dimethylamino-1-propylamine are added, the solution is warmed to 90°–95° and this temperature is maintained for 1 hour. 1,380 parts of a dark solution which can be used directly as the coupling component and contains 101 parts of the compound of the formula

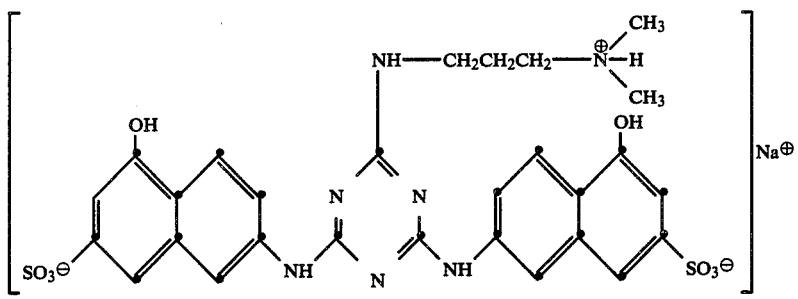

are obtained.

Example 3:

Example 2 is repeated using 33.8 parts of 3-aminopropanol instead of 45.9 parts of 3-dimethylamino-1-propylamine. The compound of the formula

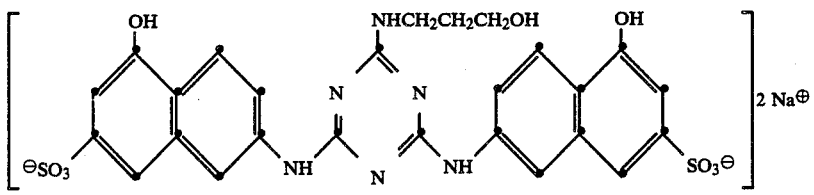

is obtained as a dark solution.

Example 4:

The procedure described in Example 2 is repeated, except that 30.8 parts of 4-aminophenyltrimethylammonium chloride are used in place of 45.9 parts of 3-dimethylamino-1-propylamine and the pH is brought to 10.

A brownish solution containing the compound of the formula

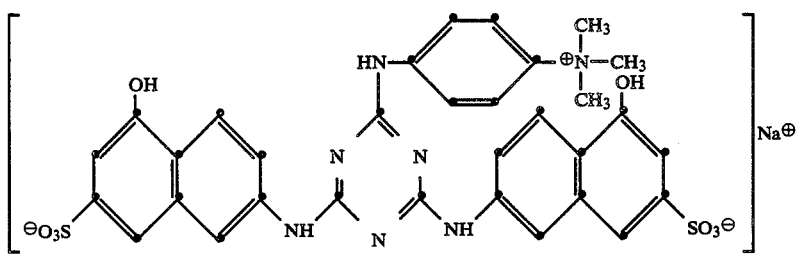

is obtained.

The corresponding 3-amino isomer is used instead of 4-aminophenyl-trimethylammonium chloride. The compound of the formula

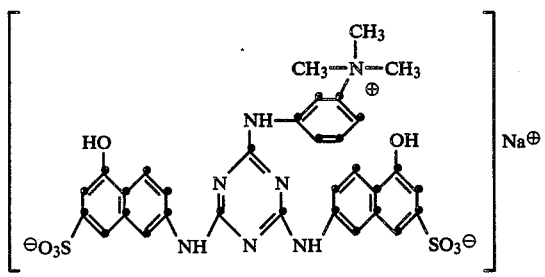

is obtained.

Example 5:

The procedure described in Example 2 is repeated, replacing the 45.9 parts of 3-dimethylamino-1-propylamine by 23.7 parts of 4-amino-N,N-dimethylbenzylamine. The compound of the formula

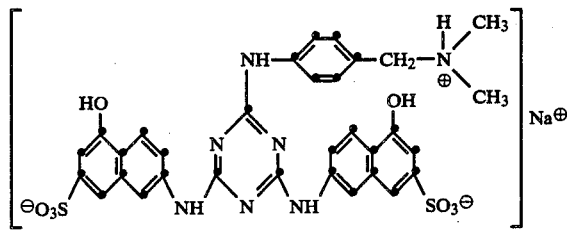

is obtained in the form of a brownish solution.

Example 6:

Example 2 is repeated, using 43.5 parts of 4-amino-N,N,N-trimethylbenzylammonium methosulfate instead of the 45.9 parts of 3-dimethylamino-1-propylamine. The compound of the formula

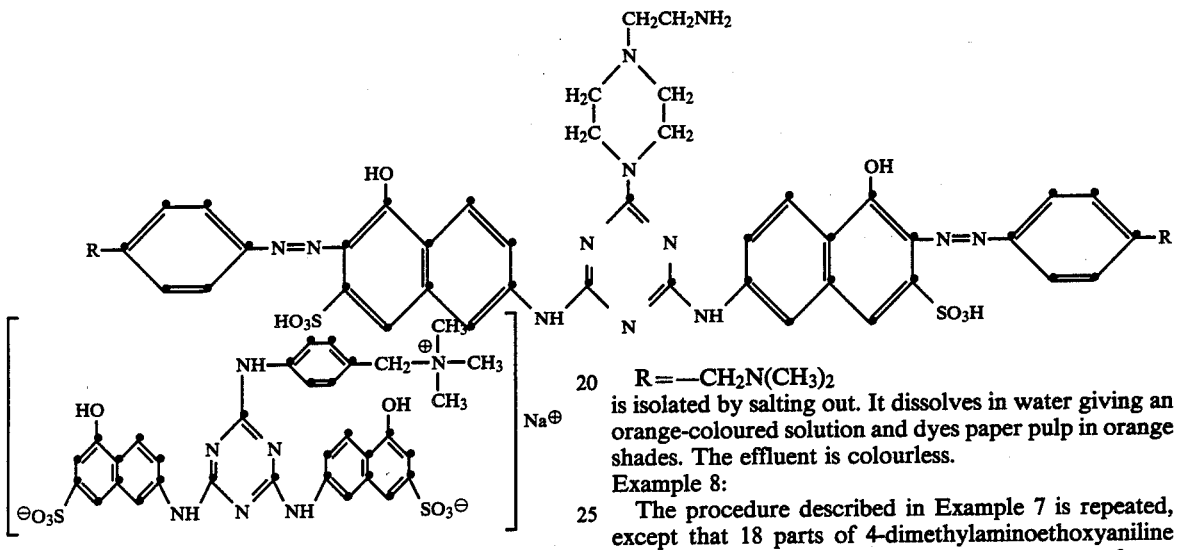

is obtained.

PREPARATION OF THE END PRODUCTS

Example 7:

15 parts of 4-aminobenzyldimethylamine are dissolved in 200 parts of water and 50 parts of concentrated hydrochloric acid. The solution is diazotised by addition of 25 parts by volume of 4N sodium nitrite solution at 0°–5°. The excess nitrous acid is destroyed with sulfamic acid.

A solution containing 34.1 parts of coupling component KI according to Example 1 is brought to pH 5 with hydrochloric acid and cooled to 0°–5°. The ice-cold diazonium solution is added and the pH of the coupling mixture is brought to 5 with sodium hydroxide solution. When the coupling has ended, the dye of the formula

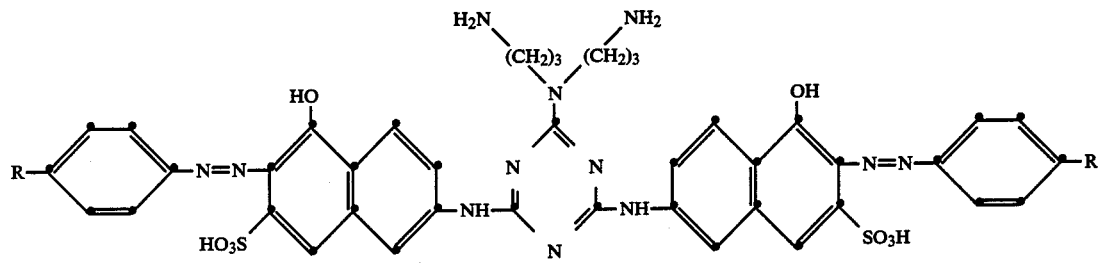

$R = -CH_2N(CH_3)_2$ is isolated by salting out. It dissolves in water giving an orange-coloured solution and dyes paper pulp in orange shades. The effluent is colourless.

Example 8:

The procedure described in Example 7 is repeated, except that 18 parts of 4-dimethylaminoethoxyaniline are used as the diazo component and 34.2 parts of coupling component KII according to Example 1 are used, affording the dye of the formula $R = O-CH_2-CH_2-N(CH_3)_2$ This compound dyes paper pulp in red shades, the effluent being colourless.

Other dyes according to the following table are obtained if the particular diazo components are coupled with the coupling component in an otherwise identical procedure. The dyes obtained dye paper in orange to violet colour shades.

TABLE
| Example | Dye |
|---|---|
| 9 | 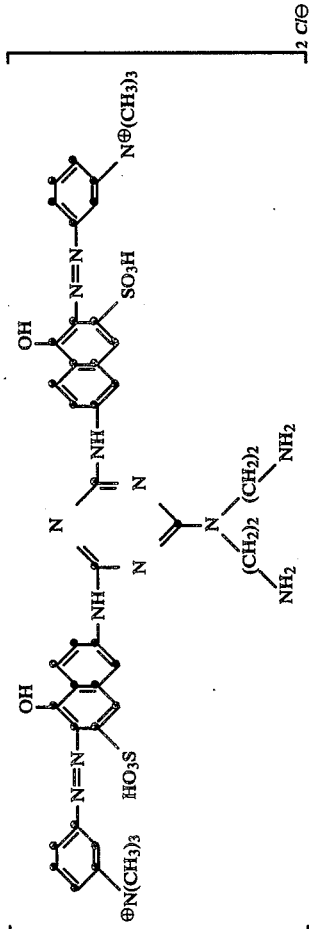 |
| 10 | 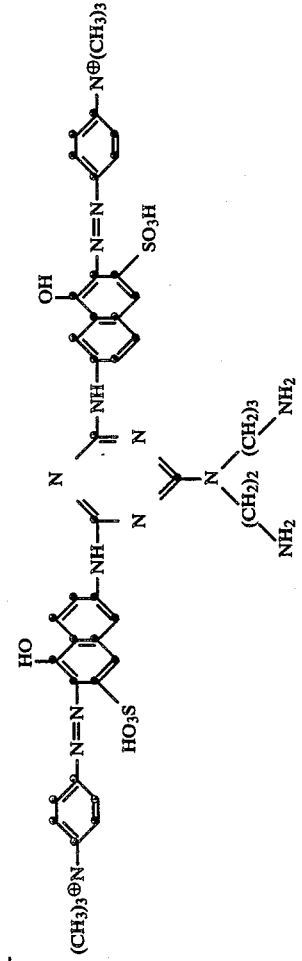 |
| 11 | 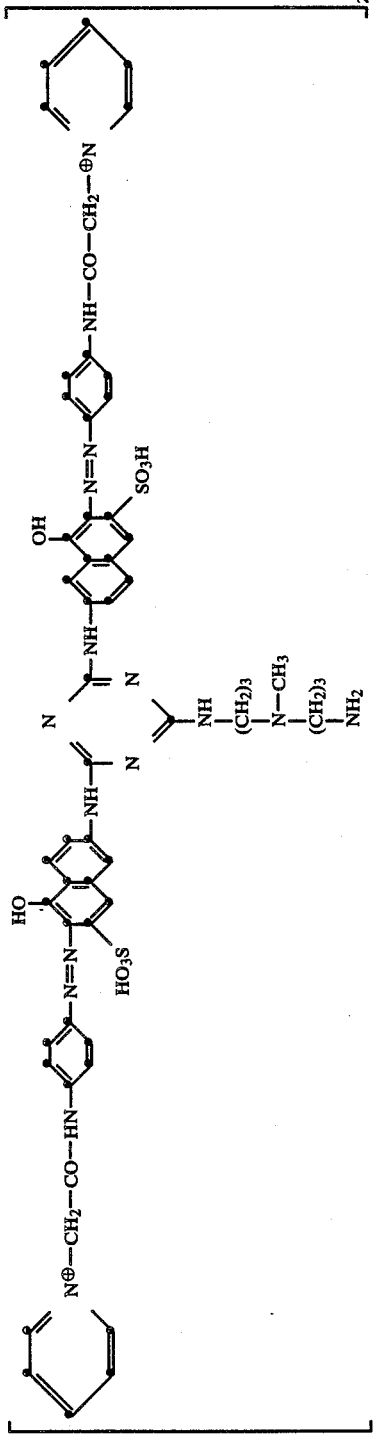 |

TABLE-continued
| Example | Dye |
|---|---|
| 12 | 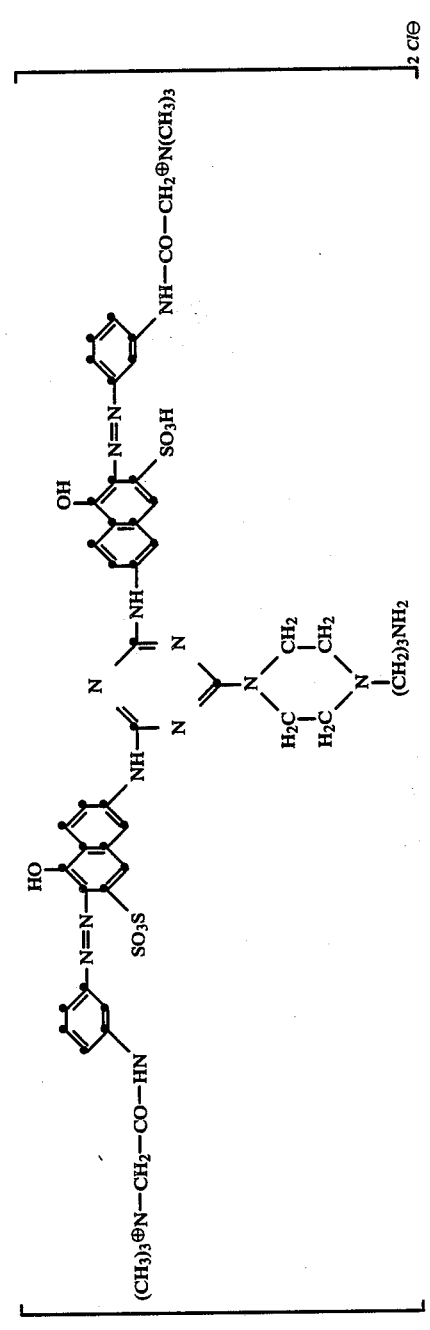 |
| 13 | 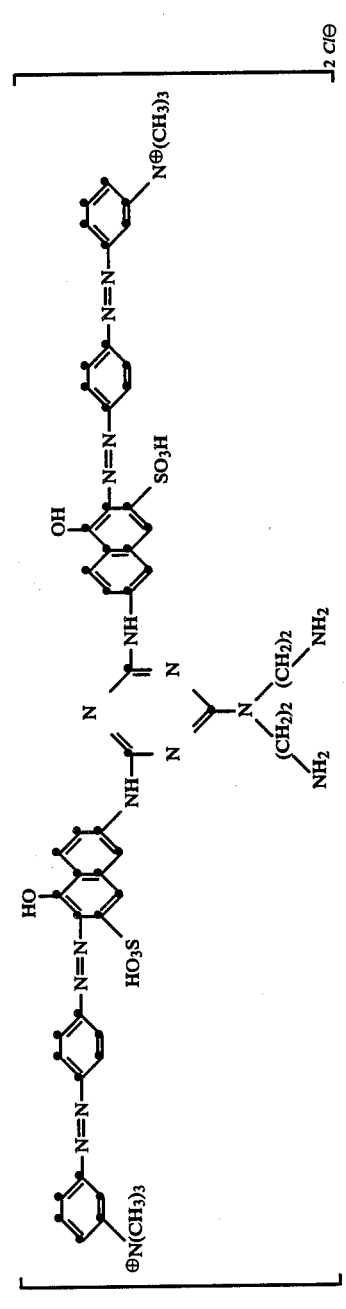 |

TABLE-continued
| Example | Dye |
|---|---|
| 14 | 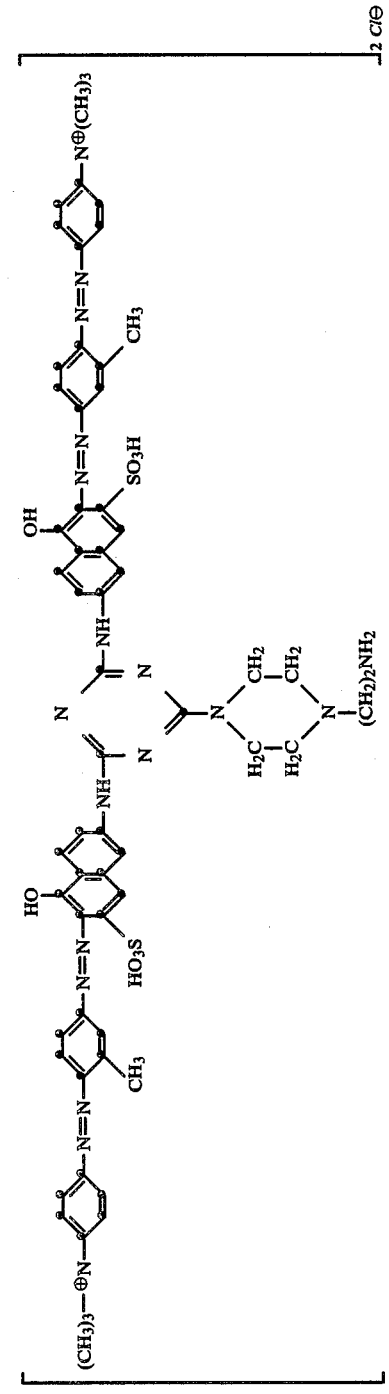 |
| 15 | 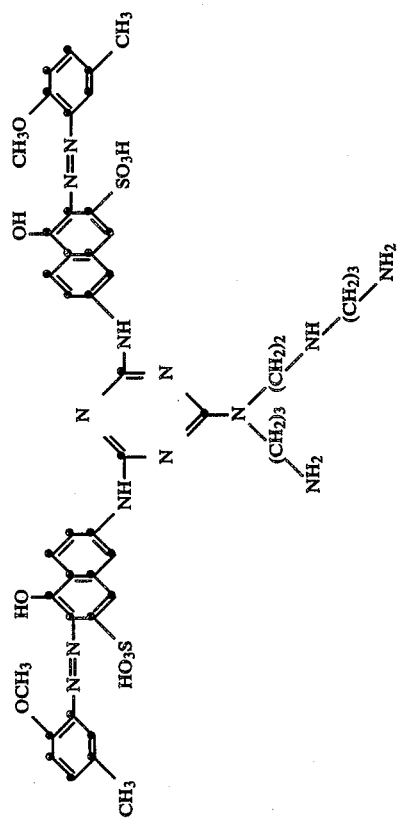 |

TABLE-continued
| Example | Dye |
|---|---|
| 16 | 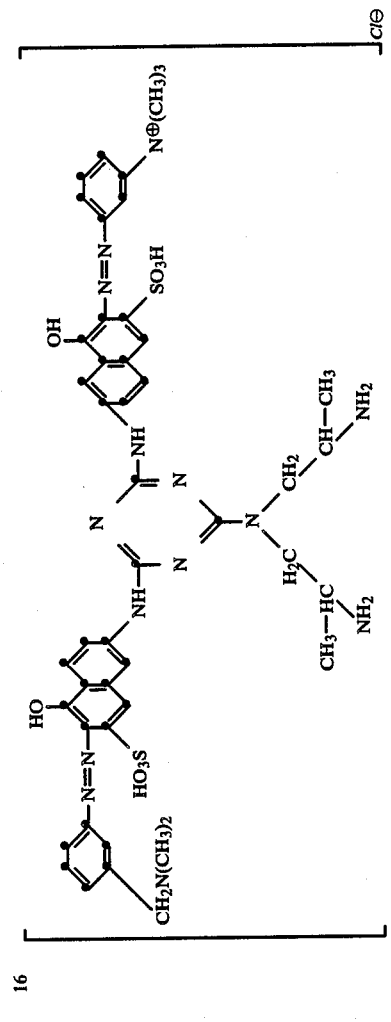 |
| 17 | 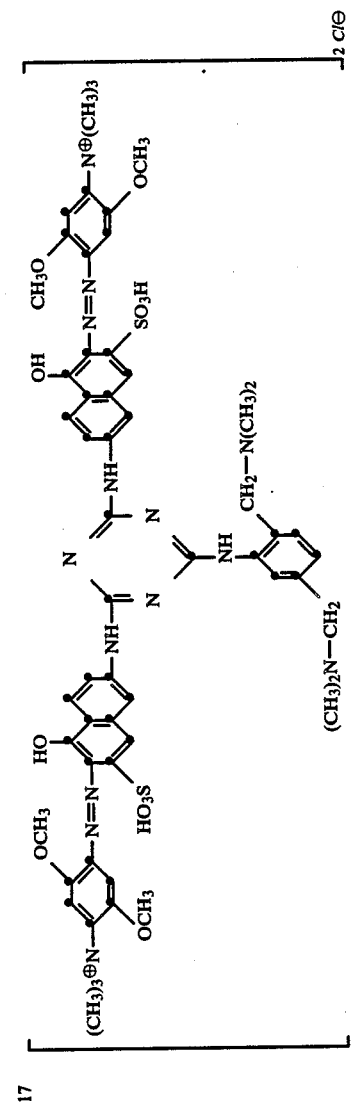 |

| Example | Dye |
|---|---|
| 18 | 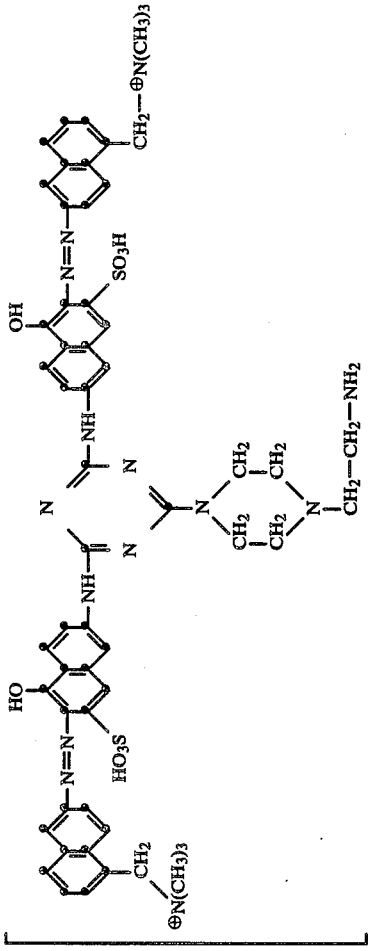 |
| 19 | 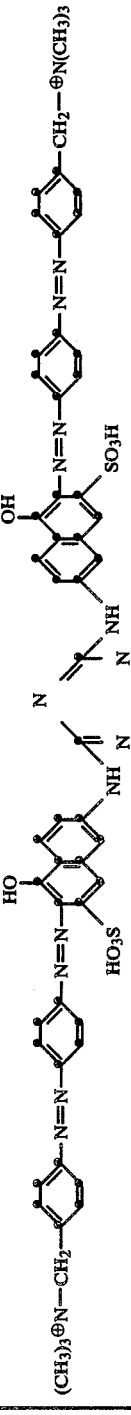 |
| 20 | 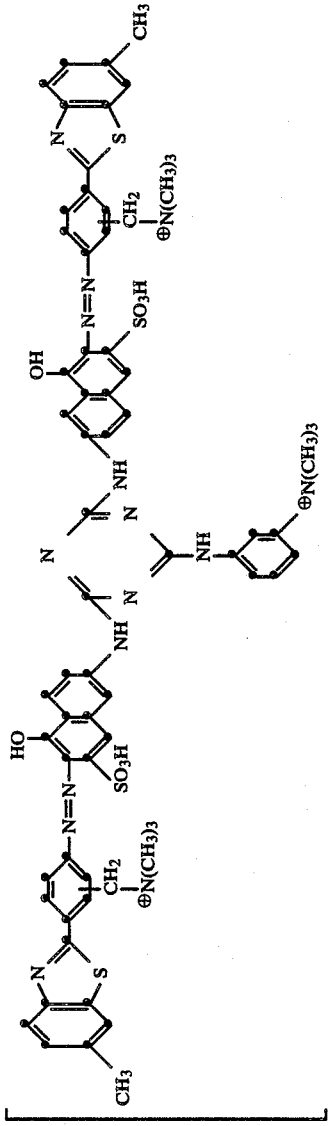 |

Example 21:

1.8 parts of the compound

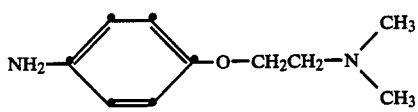

(≙ 0.01 mole) are dissolved in 30 parts of water, the solution is cooled to 0°–5°, 7.2 parts of 30% hydrochloric acid and 10 ml of 1N sodium nitrite solution are added and the mixture is stirred for ½ hour.

46 parts of the solution obtained under Example 2 (≙ 0.005 mole) are brought to pH 2.5 with hydrochloric acid in another vessel and the solution is then added dropwise to the diazo solution described above. The pH is increased to 2.5–3.0 with sodium hydroxide solution and the dark red suspension is subsequently stirred for 3 hours. The pH is brought to 7.0 by further addition of sodium hydroxide solution and the mixture is subsequently stirred for a further hour; the mixture is then filtered with suction and the residue is dried. 6.0 parts of a red-brown powder of the formula

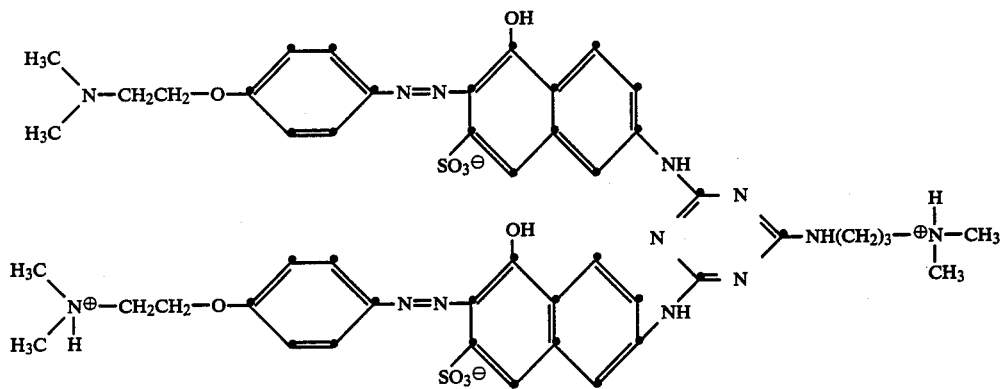

are thus obtained.

The product is outstandingly water-soluble and dyes paper in red shades, the effluent being virtually colourless.

Example 22:

The diazotisation described in Example 21 is repeated, using 2.3 parts of the compound

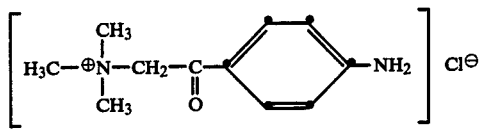

and coupling the diazonium salt at pH 2.5–3.0, at room temperature for 5 hours, to 46 parts of the solution described in Example 2. 6.3 parts of the dye of the formula

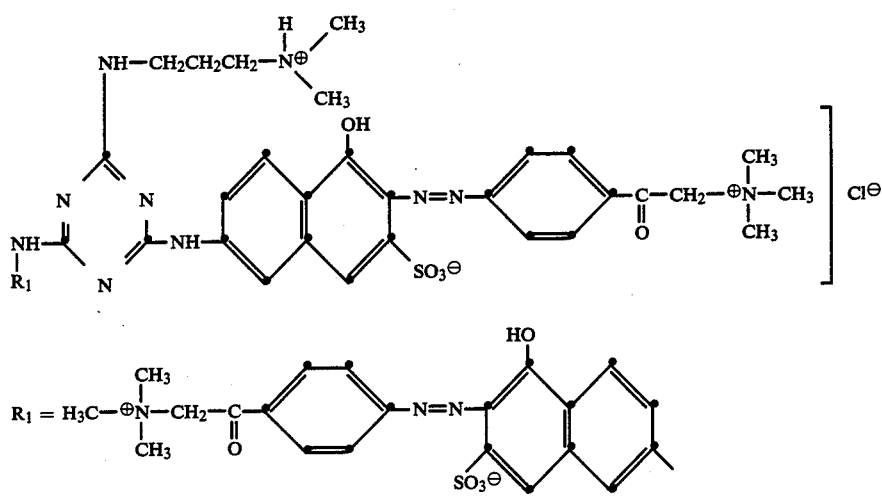

are obtained.

This compound dyes paper with a red-orange shade and with virtually colourless effluents.

The procedure described is repeated, using equivalent parts of the diazo components mentioned in the following table, column II. Dyes are obtained, the shades of which on paper can be seen from column III.

| I Example No. | II Diazo component | III Colour shade on paper |
|---|---|---|
| 23 | H₃C—⊕N(CH₃)(CH₃)—C₆H₄—NH₂ (para) | yellow-orange |
| 24 | H₃C—⊕N(CH₃)(CH₃)—C₆H₄—NH₂ (ortho) | yellow-orange |
| 25 | H₃C—⊕N(CH₃)(CH₃)—C₆H₄—N=N—C₆H₄—NH₂ | red-violet |
| 26 | (H₃C)(H₃C)N—CH₂—C₆H₄—NH₂ | red-orange |
| 27 | H₃C—⊕N(CH₃)(CH₃)—CH₂—C₆H₄—NH₂ | red-orange |
| 28 | H₃C—⊕N(CH₃)(CH₃)—CH₂—C₆H₄—N=N—C₆H₄—NH₂ | violet |

Example 29:

Example 21 is repeated, replacing the coupling component mentioned therein by 46 parts of the solution from Example 3. 5.5 parts of the dye of the formula

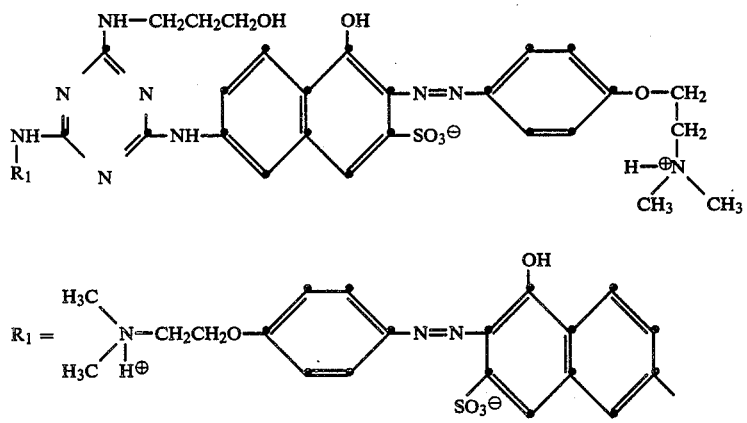

are obtained.

This dye can be brought into aqueous solution with 1 equivalent of sodium hydroxide solution and is outstandingly suitable for dyeing paper in red shades, the effluent being colourless, even when soft water is used.

Example 30:

Example 21 is repeated, replacing the coupling component mentioned by 46 parts of the solution from Example 5. 4.8 parts of the dye of the formula

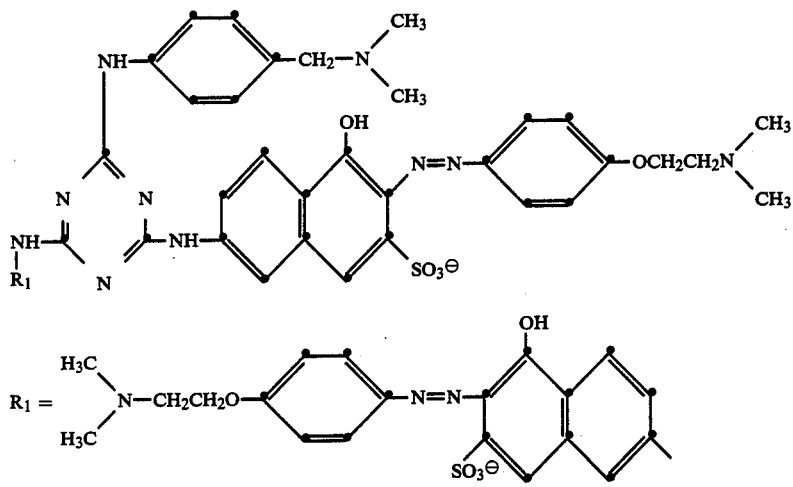

are obtained.

This dye can be brought into solution with dilute sodium hydroxide solution and dyes paper in red shades with excellent effluent values.

USE

Example 31:

50 parts of chemically bleached beech sulfite are mixed with 50 parts of bleached RKN 15 (degree of beating of 22° SR) and 2 parts of the dye according to Example 7 are mixed in water (pH 6, water hardness of 10° German hardness, temperature 20°, liquor ratio 1:40). After the mixture has been stirred for 15 minutes, sheets of paper are produced on a Frank sheet-forming machine.

The paper is dyed a very intense red shade. The effluent is completely colourless. The degree of exhaustion reaches virtually 100%. The wet-fastnesses and light-fastnesses are excellent.

Example 32:

A web of paper is produced from bleached beech sulfite (22° SR) on a continuously operating laboratory papermaking machine. Ten seconds before the headbox, an aqueous solution of the dye according to Example 7 is metered in continuously with vigorous turbulence of the thin stuff (0.5% dyeing, liquor ratio 1:400, water hardness of 10° German hardness, pH 6, temperature 20°).

A deep red shade of moderate intensity is produced on the web of paper. The effluent is completely colourless.

Example 33:

10 parts of cotton fabric (bleached mercerised cotton) are dyed in 200 parts of a liquor (water hardness of 10° German hardness, pH 4, 3 turns of the dye liquor per minute) containing 0.05 part of the dye according to Example 7 in a laboratory beam-dyeing apparatus. The temperature is raised from 20° to 100° in the course of 60 minutes and is then kept constant for 15 minutes.

The dye liquor is completely exhausted. A deep red dyeing of good light-fastness and very good wet-fastness is produced on the cotton fabric.

The dyeing procedure is repeated on a textile fabric of regenerated cellulose (viscose). On this material also, the dye of Example 7 produces a deep red dyeing of good light-fastness and very good wet-fastness.

What is claimed is:

1. A water-soluble triazine compound of the formula

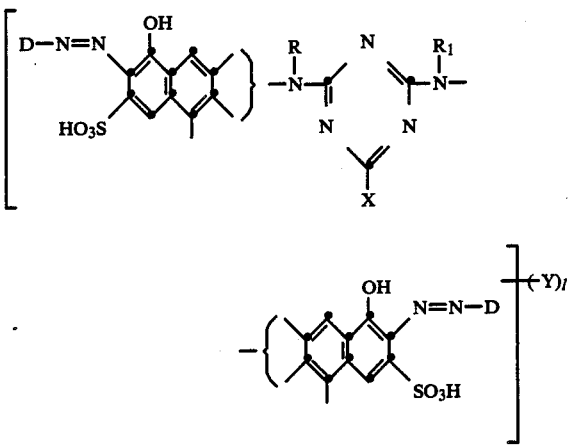

in which D is a benzene or azobenzene radical which groups are unsubstituted or substituted by $C_1$–$C_4$-alkyl, $C_1$–$C_4$-alkoxy, acetylamino or a 6-methyl-benzothiazole radical, R and $R_1$ independently of one another are hydrogen or $C_1$–$C_4$-alkyl, X is $C_1$–$C_4$-alkylamino, $C_1$–$C_4$-hydroxyalkylamino, di-($C_1$–$C_4$-alkyl)amino, di-($C_1$–$C_4$-hydroxyalkyl)amino, phenylamino wherein phenyl is unsubstituted or substituted by $C_1$–$C_4$-alkyl or $C_1$–$C_4$-hydroxyalkyl, or X is a group of the formula

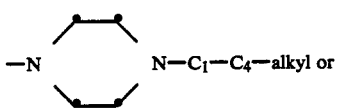

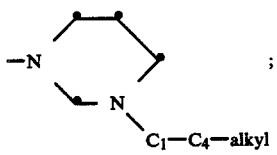

or X is $C_1$–$C_4$-alkoxy or phenoxy which is unsubstituted or is substituted by $C_1$–$C_4$-alkyl or $C_1$–$C_4$-hydroxyalkyl, the symbols Y, which are identical or different, are each a basic or cationic group of the formula

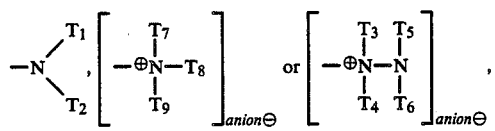

in which $T_1$ and $T_2$ independently of one another are hydrogen, $C_1$-$C_4$-alkyl or $C_1$-$C_4$-alkyl substituted by hydroxyl, $C_1$-$C_4$-alkoxy,

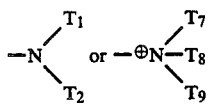

or $T_1$ and $T_2$ together with the nitrogen to which they are attached form a pyrrolidine, piperidine, morholine or piperazine ring; $T_3$ and $T_4$ independently of one another are $C_1$-$C_4$-alkyl or cycloalkyl, $T_5$ and $T_6$ independently of one another are hydrogen, $C_1$-$C_4$-alkyl or cycloalkyl, $T_9$ is $C_1$-$C_4$-alkyl or $C_1$-$C_4$-alkyl substituted by phenyl, alkyl(-$C_1$-$C_4$)-phenyl, hydroxyl, halogen, cyano,

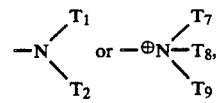

$T_7$ has the same meanings as $T_9$ or is cycloalkyl which is unsubstituted or substituted by $C_1$-$C_4$-alkyl and $T_8$ has the same meaning as $T_7$ or is $C_1$-$C_4$-alkoxy; or $T_7$, $T_8$ and $T_9$ together with the nitrogen to which they are attached form a pyridinium ring which is unsubstituted or substituted by methyl, hydroxyl, amino, carboxy or cyano, or form a triethylenediamine ring of the formula

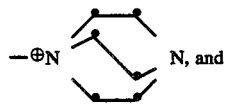

$l$ is 2, 3, 4, 5 or 6, at least one Y being located in X, and the number of basic and cationic groups Y in the molecule must be equal to or greater than the number of $SO_3H$ groups.

2. A water-soluble triazine compound according to claim 1, in which R and $R_1$ are each hydrogen.

3. A water-soluble triazine compound according to claim 1, in which X is monosubstituted or disubstituted amino.

* * * * *